United States Patent [19]

Nagashima et al.

[11] Patent Number: 4,534,005
[45] Date of Patent: Aug. 6, 1985

[54] CHAIN SAW

[75] Inventors: Akira Nagashima, Kawasaki; Tadashige Kondo, Tokyo, both of Japan

[73] Assignee: Kioritz Corporation, Tokyo, Japan

[21] Appl. No.: 376,819

[22] Filed: May 10, 1982

[30] Foreign Application Priority Data

May 14, 1981 [JP] Japan ................................. 56-71427

[51] Int. Cl.³ ............................................... F01M 1/18
[52] U.S. Cl. .................................. 364/505; 364/551; 364/510; 184/6.1
[58] Field of Search ............... 364/510, 505, 506, 551, 364/140; 184/6.1, 15 R, 6

[56] References Cited

U.S. PATENT DOCUMENTS

| | | | |
|---|---|---|---|
| 3,674,112 | 7/1972 | Roberts | 184/6.1 |
| 3,776,369 | 12/1973 | Schrack et al. | |
| 3,809,185 | 5/1974 | Kobayashi et al. | |
| 3,856,114 | 12/1974 | Zanki | 184/6.1 |
| 4,009,699 | 3/1977 | Hetzler et al. | 364/551 X |
| 4,241,403 | 12/1980 | Schultz | 364/551 X |
| 4,328,603 | 4/1982 | Darrow et al. | 364/505 X |
| 4,364,111 | 12/1982 | Jocz | 364/510 X |
| 4,418,388 | 11/1983 | Allgor et al. | 364/551 X |
| 4,445,168 | 4/1984 | Petryszyn | 364/140 |

Primary Examiner—Edward J. Wise
Attorney, Agent, or Firm—Karl W. Flocks; Sheridan Neimark; A. Fred Starobin

[57] ABSTRACT

A chain saw including an electromagnetic pump (4) for feeding lubricant to saw chain operative in response to an engine speed sensor (5) for sensing the rpm of an internal combustion engine and a microcomputer (6) for controlling the operation of the electromagnetic pump (4). The microcomputer (6) stores a plurality of lubricant feeding patterns covering the number of actuations of the electromagnetic pump (4), the actuation frequency and the period of time of each actuation so as to control automatically the feeding of lubricant to the saw chain from the electromagnetic pump (4) in response to the engine speed sensor (5) to effect lubricant feeding in conformity with the sawing condition.

3 Claims, 7 Drawing Figures

CHAIN SAW

BACKGROUND OF THE INVENTION

This invention relates to chain saws, and more particularly it deals with a chain saw receiving a supply of required lubricating oil for a saw chain in conformity with the sawing condition.

Generally, feeding of lubricant to a saw chain is not performed in conformity with a sawing condition but carried out substantially at a predetermined volume by utilizing the rotation of the internal combustion engine of the chain saw even in idling speed. In some cases where attention is paid to avoiding seizure of the saw chain, an additional supply of lubricant is made available by means of a manually operated pump.

Means for feeding lubricant, directly linked to the engine rotation, is not only unable to prevent dissipation of the lubricant during idling, but also unable to effect lubricant feeding in a rational manner to permit sawing operations with increased efficiency. Thus there has been a demand for means for performing lubricant feeding in a manner to increase the efficiency of sawing.

SUMMARY OF THE INVENTION

Accordingly this invention has as its object the provision of a chain saw capable of performing feeding of lubricant in a rational manner by avoiding waste of the lubricant resulting from the use of conventional means of feeding lubricant which is directly linked to the engine rotation, so that sawing operations can be performed with increased efficiency by virtue of a lubricant feeding suiting the sawing condition while enabling waste of lubricant to be avoided and allowing effective use of the lubricant to be realized by ensuring a self-absorption property.

The feature of the invention is that the volume of lubricant fed to the saw chain can be made to suit the operating condition of the saw and an efficient lubricant feeding operation can be performed by avoiding waste of the lubricant in accordance with lubricant feeding patterns stored in a microcomputer. It is possible to effect intermittent feeding of lubricant by a time-difference system so as to effectively control lubricant feeding to achieve effective feeding of lubricant while reducing the consumption of the lubricant. The pump can be operated at low speed in spite of the chain saw being operated at high speed, thereby improving the self-absorption property of the pump.

PREFERRED EMBODIMENT OF THE INVENTION

Figure 1:
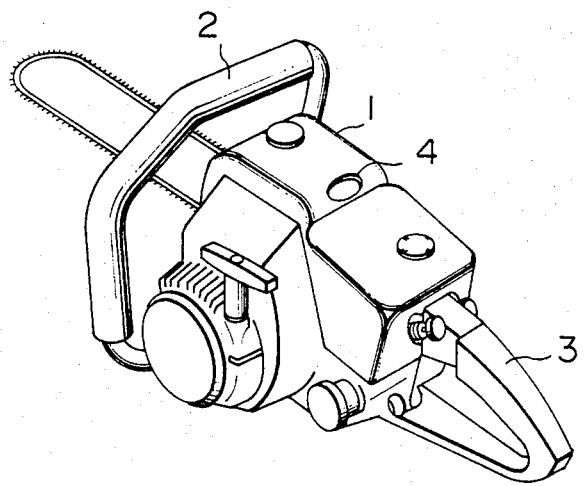
FIG. 1 is a perspective view of the chain saw comprising one embodiment of the invention.

A preferred embodiment of the invention will be described by referring to the accompanying drawings. The chain saw comprising one embodiment comprises, as shown in FIG. 1, main body 1, and a front handle 2 and a rear handle 3 to be gripped by the operator located at the front and the rear of the main body 1. The main body 1 includes an internal combustion engine as its main constituent, and a pump 4 partly shown at an upper portion of the main body 1. The pump 4 is an electromagnetically operated pump (solenoid-operated pump) using as a power source a flywheel type magneto 8. However, the invention is not limited to this specific form of pump and the pump 4 may be an electrically operated rotary pump of the small size.

Figure 2:
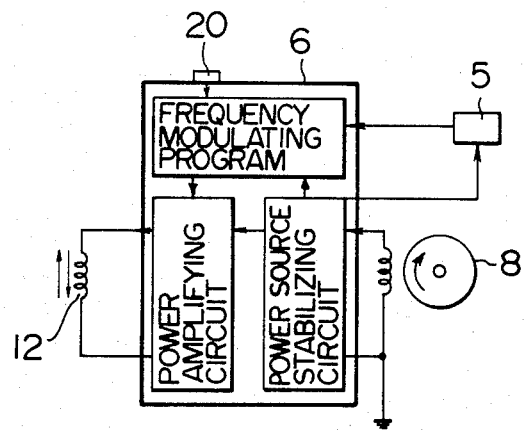
FIG. 2 is a block diagram of the circuits.
Figure 3:
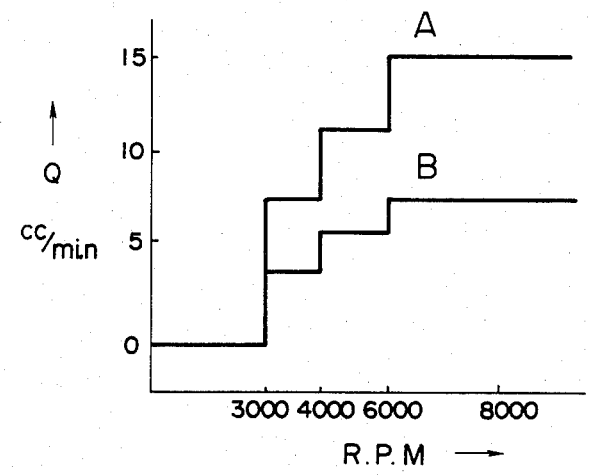
FIG. 3 is a graph in explanation of electromagnetic control of lubricant feeding effected by means of a sensor for sensing the rpm of the engine of the electromagnetic pump.
Figure 4:
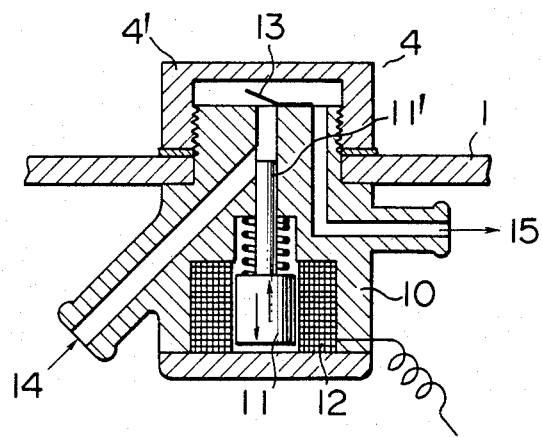
FIG. 4 is a sectional view of the electromagnetic pump.

FIG. 4 shows the electromagnetic plunger pump 4 in cross section which comprises a casing 10 mounted on the main body 1, a solenoid 12 located in the casing 10, a plunger 11' located in the casing 10 and driven by the solenoid 12 for reciprocatory movement, and a non-return valve 13, for performing a pumping action to supply lubricant to the saw chain. The electromagnetic pump 4 is actuated by a microcomputer 6 responsive to an engine speed sensor 5 for sensing the rpm of the engine as shown in FIG. 2. The microcomputer 6 includes a frequency modulating program, a power source stabilizing circuit, and a power amplifying circuit and receives power from a magneto 8 serving as a power source. FIG. 3 shows lubricant stepped feeding patterns corresponding to the engine speed information from the engine speed sensor 5 according to which the microcomputer 6 gives instructions to the electromagnetic plunger pump 4 to operate to supply a small amount of lubricant or feed no lubricant at all when the rpm is below about 3000 rpm and to feed an increasingly greater amount of lubricant in accordance with the operation when the rpm rises. The lubricant feeding patterns A and B may be selectively used depending on the material to be sawed. That is, when the material is soft, lubricant may be fed by the pattern B, but the pattern A is used when the material is hard to prevent overheating of the saw chain. Switching of the pump 4 between the A and B patterns may be advantageously effected manually by the operator which is convenient and involves less addition of cost. To this end, a manually operated switch 20 may be provided to the microcomputer 6, as shown in FIG. 2. The pump 4 may be clamped to the surface of the main body 1 by using a lid 4' as shown in FIG. 4. If the lid 4' is formed of a transparent material and mounted in a visible portion of the machine, feeding of lubricant can be checked by the operator. However, this is not essential and a nontransparent material may be used for forming the lid 4'. The casing 10 contains an electromagnetic coil (solenoid) 12, and an iron core 11 which is formed as a unit with the pump plunger 11' cooperating with the non-return valve 13 to perform a pumping action. The lubricant flows through a suction port 14 of the casing 10 toward a discharge port 15 through the non-return valve 13. The iron core 11 operates under instructions from the microcomputer 6 and has the number of actuations and periods and intervals thereof controlled in such a manner that the pump 4 may have any characteristic as desired.

Figure 5:
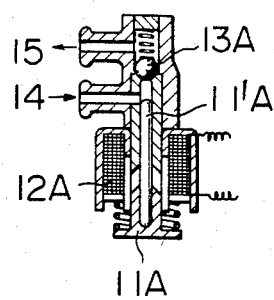
FIGS. 5 and 6 are sectional views of other electromagnetic pumps.

In the electromagnetic plunger pump 4 shown in FIG. 4, the non-return valve 13 is in the form of a plate spring. However as shown in FIG. 5, a ball valve may be used. A plunger 11' A with iron core 11A is moved in reciprocatory movement by a solenoid 12A to make pump 4 perform a pumping action while a ball 13A acts as a non-return valve.

Figure 6:
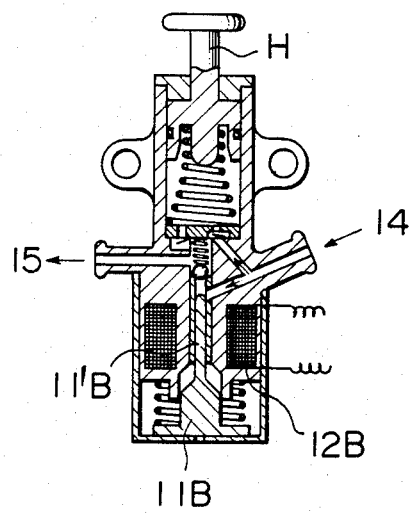

FIG. 6 shows another electromagnetic plunger pump having a manually operated pump section H in which a plunger 11'B with iron core 11B can be electrically driven through a solenoid 12B and a piston in an upper portion can be manually moved vertically, to perform a pumping action.

Figure 7:
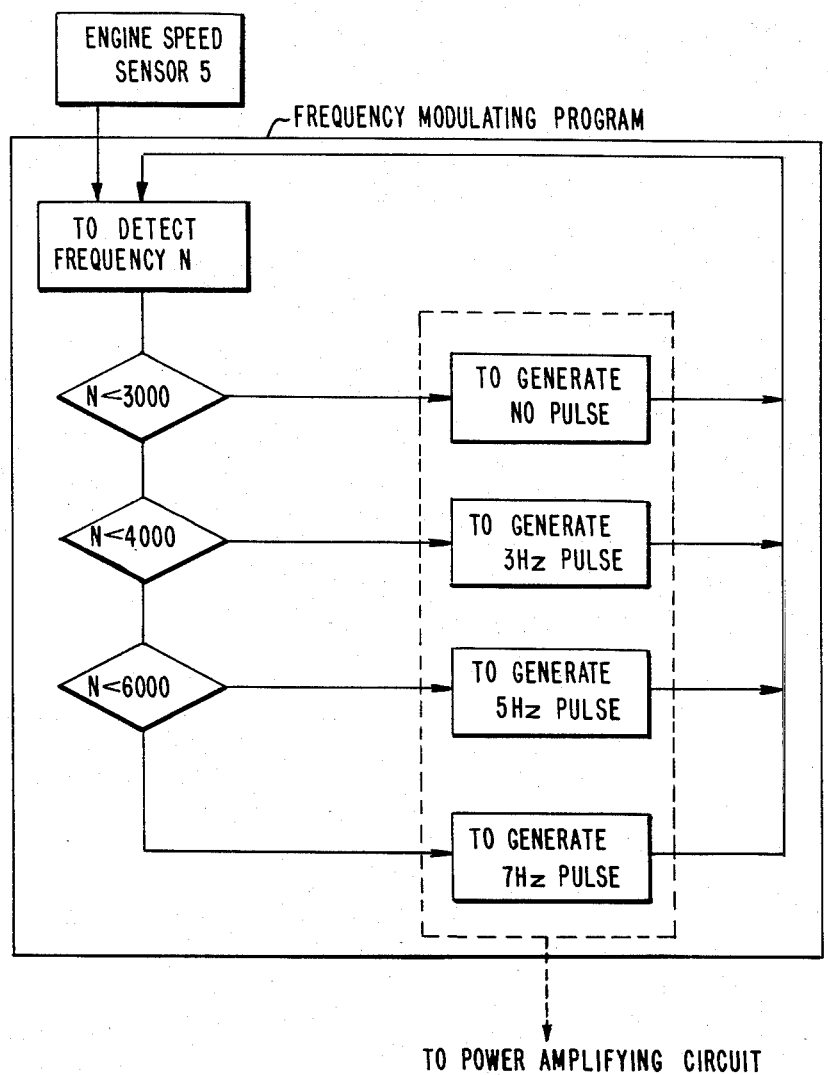
FIG. 7 is a flow chart of an example of programming for the system of the present invention.

The frequency modulating program shown as part of the block diagram of the circuits in FIG. 2 is shown in more detail in FIG. 7. This is a flow chart with a program functioning as has been described for this system. With this program, lubricant on the saw of the chain is injected directly in accordance with the speed of the chain saw engine and the amount of lubricant increases in the stepped pattern shown graphically in FIG. 3. Engine speed sensor 5 senses the rpm of the engine of the electromagnetically operated pump. Microcomputer 6, including the frequency modulating program of FIG. 7, gives instructions to pump 4 to generate no pulse and feed a small amount or no lubricant at all when the rpm is less than 3000 rpm, and to feed increasingly greater amounts of lubricant at steps of 4000 and 6000 rpm by generation of appropriate higher frequency pulses. Such a program can accomplish the purposes of the present invention with its inherent advantages.

What is claimed is:

1. A chain saw provided with an electromagnetic pump for feeding lubricant to saw chain, comprising an engine speed sensor for sensing the rpm of an engine and a microcomputer for controlling the operation of the electromagnetic pump, wherein;

said microcomputer having stored therein a plurality of stepped lubricant feeding patterns covering the number of actuations of the electomagnetic pump, the actuation frequency and the period of time of each actuation so as to control automatically the feeding of lubricant to the saw chain from the electromagnetic pump in response to the engine speed sensor to effect lubricant feeding in conformity with the sawing condition.

2. A chain saw as claimed in claim 1, wherein said microcomputer receives a supply of power from a flywheel type magneto serving as a power source.

3. A chain saw as claimed in claims 1 or 2, wherein said microcomputer includes a manually operated switch for effecting switching of the microcomputer between the plurality of lubricant feeding patterns.

* * * * *